Figure 1:
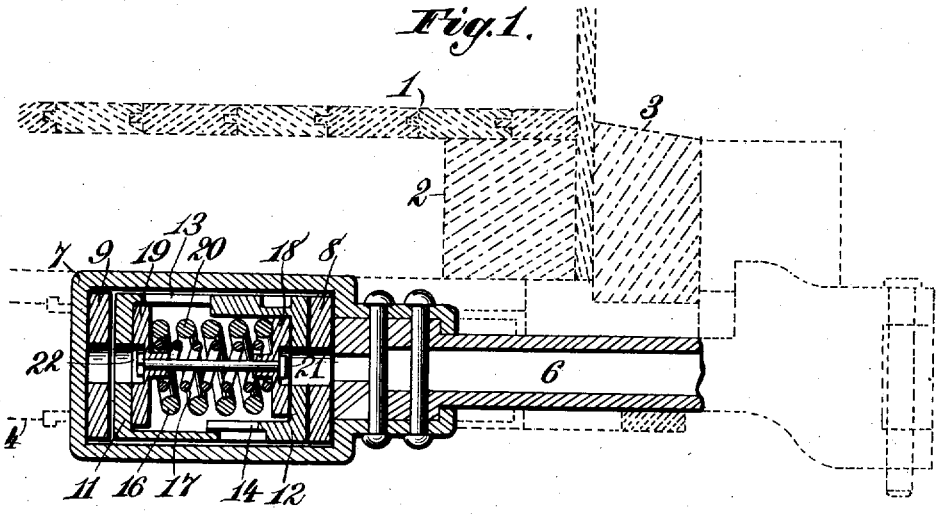

R. E. L. JANNEY.

FRICTION MECHANISM FOR RESISTING STRAINS.

APPLICATION FILED APR. 15, 1914.

Reissued June 9, 1914.

13,744.

4 SHEETS—SHEET 1.

Witnesses:
Edwin L. Jewell
S. Boland

Inventor.
Robert E. L. Janney
by Percy S. Hills
Atty

R. E. L. JANNEY.

FRICTION MECHANISM FOR RESISTING STRAINS.

APPLICATION FILED APR. 15, 1914.

Reissued June 9, 1914. 13,744.

4 SHEETS—SHEET 2.

Witnesses:
Edwin L. Yewell
S. Boland

Inventor,
Robert E. L. Janney
by Percy B. Hills
Atty.

R. E. L. JANNEY.

FRICTION MECHANISM FOR RESISTING STRAINS.

APPLICATION FILED APR. 15, 1914.

Reissued June 9, 1914. 13,744.

4 SHEETS—SHEET 3.

Witnesses:
Edwin L. Jewell
S. B. Roland

Inventor.
Robert E. L. Janney
by Percy B. Hills
Atty

R. E. L. JANNEY.

FRICTION MECHANISM FOR RESISTING STRAINS.

APPLICATION FILED APR. 15, 1914.

Reissued June 9, 1914.

13,744.

4 SHEETS—SHEET 4.

Witnesses:
Edwin L. Yewell
S. Boland

Inventor,
Robert E. L. Janney
by Percy B. Hills
atty

UNITED STATES PATENT OFFICE.

ROBERT E. L. JANNEY, OF CHICAGO, ILLINOIS.

FRICTION MECHANISM FOR RESISTING STRAINS.

13,744. Specification of Reissued Letters Patent. Reissued June 9, 1914.

Original No. 670,320, dated March 19, 1901, Serial No. 39,037. Application for reissue filed April 15, 1914. Serial No. 832,139.

*To all whom it may concern:*

Be it known that I, ROBERT E. L. JANNEY, a citizen of the United States, now residing in the city of Chicago, county of Cook, and State of Illinois, have invented new and useful Improvements in Friction Mechanism for Resisting Strains, of which the following is a specification.

My invention relates to mechanism for affording a frictional resistance to a strain in conjunction with that afforded by a spring or springs placed under tension by said strain, and has for its object to provide a friction member or members that will be rotated by the strain to be resisted against adjacent friction surfaces and also, if desired, against each other.

In the drawings accompanying this specification I have illustrated several forms of application of my novel construction, the same being designed more particularly for use in connection with the draft rigging of railway cars, though, as shown, it is equally applicable to car trucks and other analogous uses, and I do not therefore limit myself to any particular use, as the same is adapted to be applied wherever a spring is employed to resist a strain.

Figure 2:
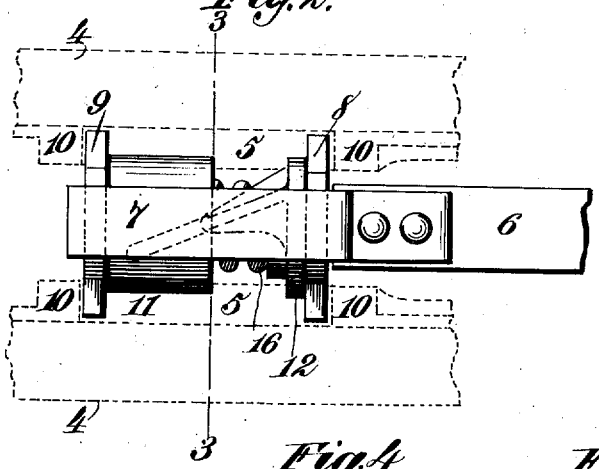
Figure 3:
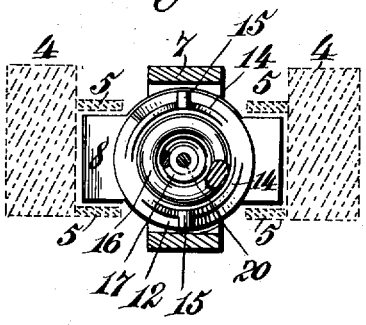
Figure 4:
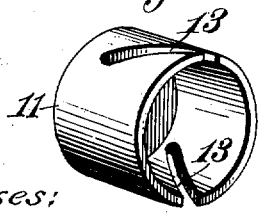
Figure 5:
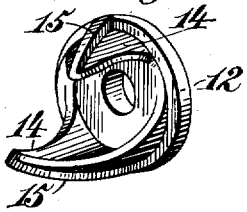
Figure 6:
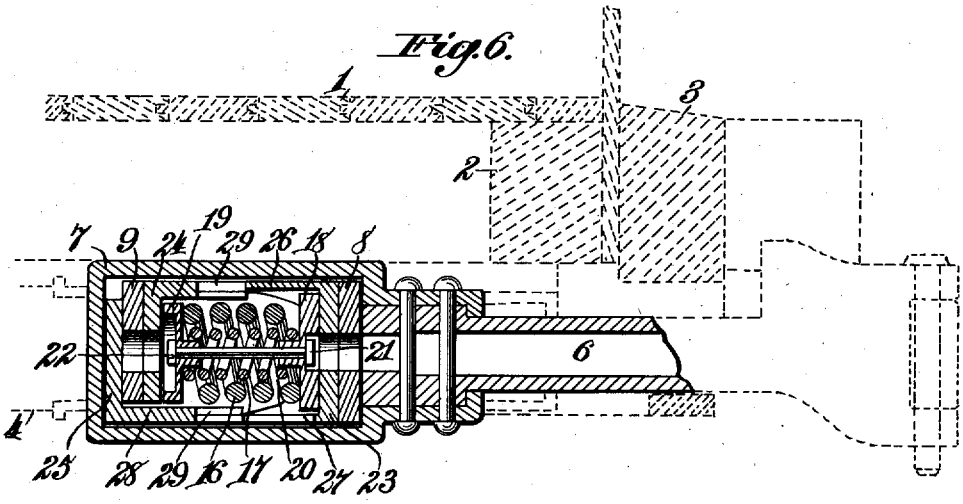
Figure 7:
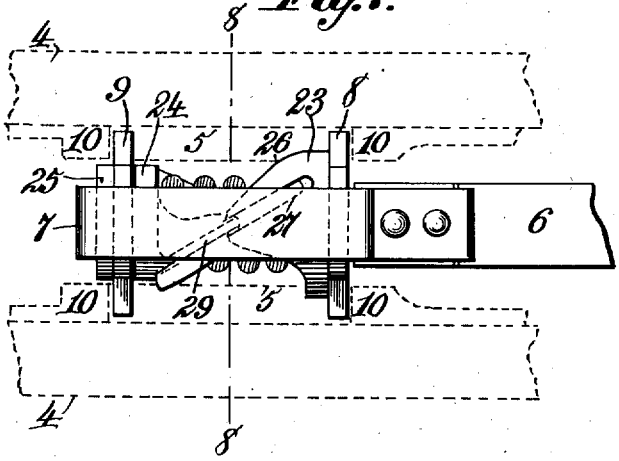
Figure 8:
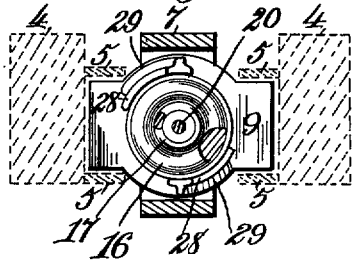
Figure 9:
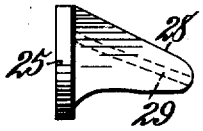
Figure 10:
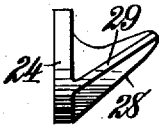
Figure 11:
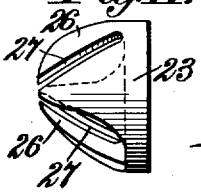
Figure 12:
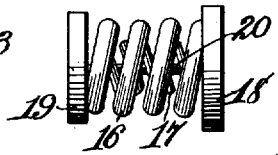
Figure 13:
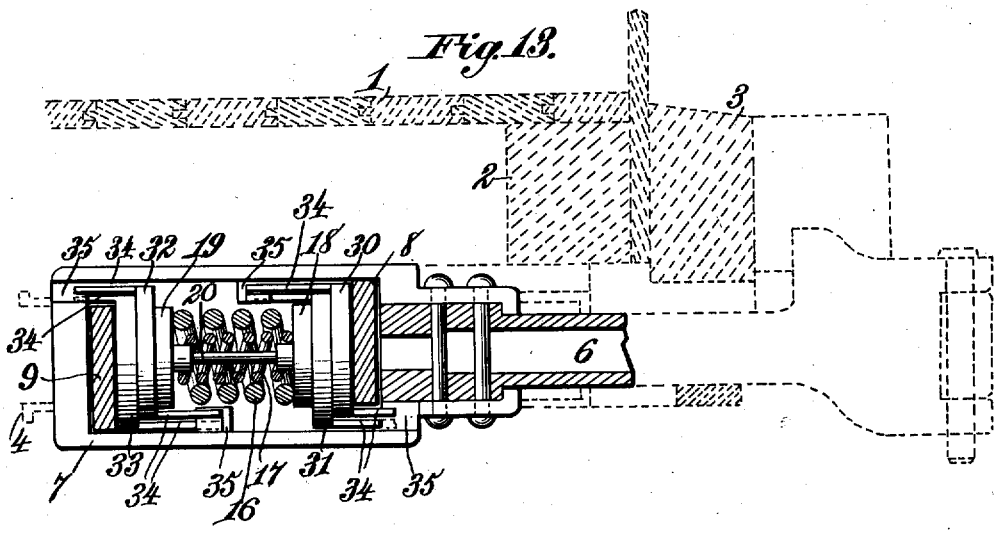
Figure 14:
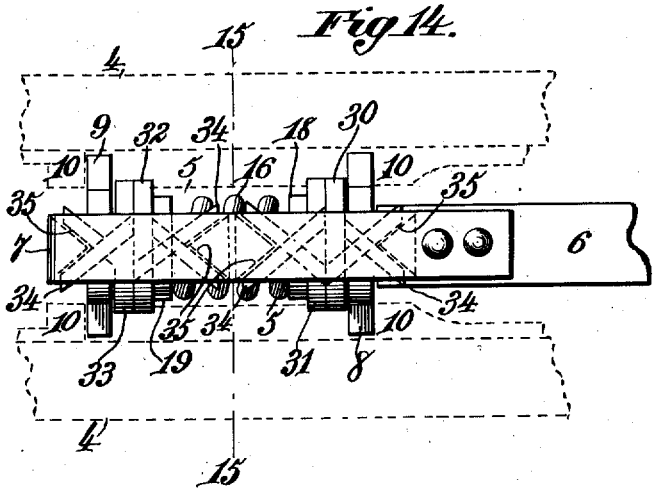
Figure 15:
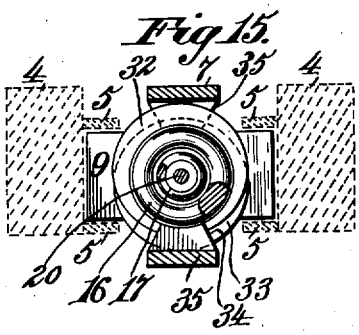
Figure 16:
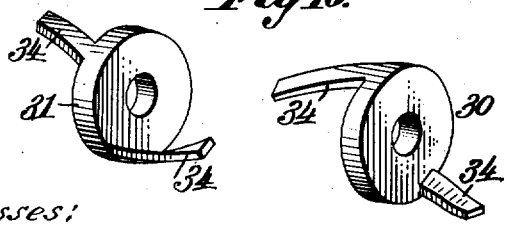
Figure 17:
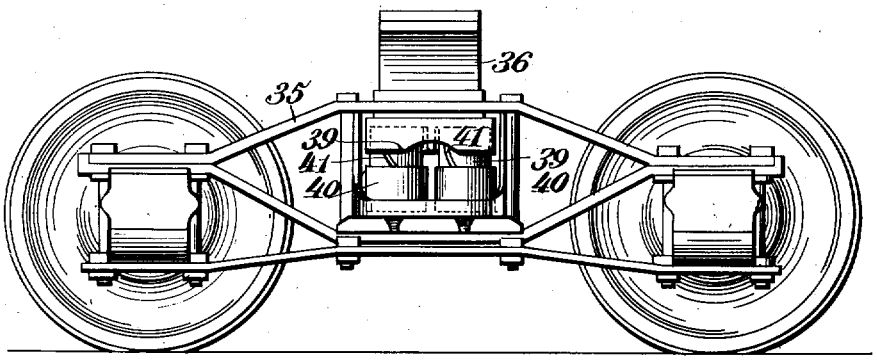
Figure 18:
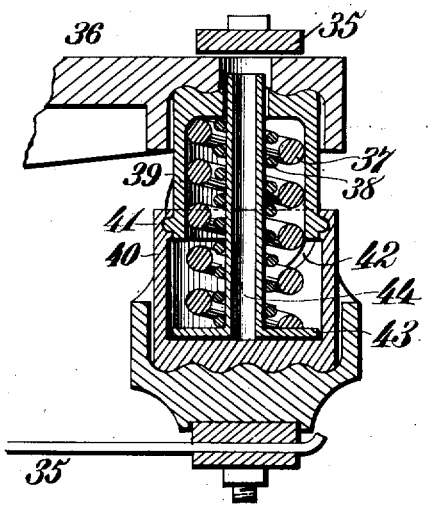
Figure 19:
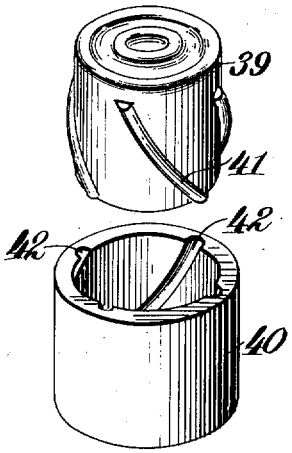
Figure 20:
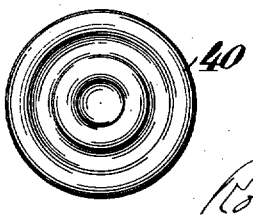

In the accompanying drawings: Figure 1 is a vertical longitudinal sectional view of a draft rigging embodying one form of my improved construction. Fig. 2 is a top plan view of the same. Fig. 3 is a vertical transverse sectional view taken on the line 3—3, Fig. 2. Figs. 4 and 5 are detail perspective views of my improved friction members. Fig. 6 is a view similar to Fig. 1, showing another form of my improvement. Fig. 7 is a view similar to Fig. 2 of the construction shown in Fig. 6. Fig. 8 is a view similar to Fig. 3, taken on the line 8—8, Fig. 7. Figs. 9, 10 and 11 are detail perspective views of the friction members shown in Figs. 6, 7 and 8. Fig. 12 is a detail side elevation of the springs and their retaining parts, the same being a preferred construction. Fig. 13 is a view similar to Fig. 1, illustrating still another form of my improvement. Fig. 14 is a view similar to Fig. 2 of the construction shown in Fig. 13. Fig. 15 is a view similar to Fig. 3, taken on the line 15—15, Fig. 14. Fig. 16 is a detail perspective view of two of the friction members shown in Figs. 13, 14 and 15. Fig. 17 is a detail side elevation of a car truck, showing a slightly modified form of my improved construction applied thereto as a truck spring. Fig. 18 is an enlarged detail vertical sectional view of one of the truck springs and its parts shown in Fig. 17. Fig. 19 is a detail perspective view of the friction members of one of said truck springs. Fig. 20 is a detail bottom plan view of the lower one of said members shown in Fig. 19.

Similar numerals of reference denote as far as possible corresponding parts in the several views.

Referring more particularly to Figs. 1 to 5, the numeral 1 denotes the floor of the car; 2, the interior end cross beam thereof; 3, the exterior buffing block, and 4 the longitudinal draft timbers, having bolted thereto the usual draft irons or cheek pieces 5, between which lies the shank 6 of the draw bar in the usual manner. Bolted to the rear end of said draw bar 6 is the yoke or loop 7, extending thence to and around the movable parts of the draft rigging, inclosing the same in the well-known manner.

Located within the enlarged portion of the yoke or loop 7 are the followers 8 and 9, the former abutting against the rear end of the draw bar 6, while the latter abuts against the rear end of the yoke or loop 7, as shown. These followers extend outward on both sides to almost the extreme width between the draft timbers 4 and normally contact with the shoulders 10, formed on the draft irons 5, as clearly shown in Fig. 2. Also located within the yoke or loop 7 and between the followers 8 and 9 are the two friction members 11 and 12, the former being cup-shaped and having the diagonal slots 13 therein, while the latter is provided with wings 14, having diagonal lugs 15 exteriorly thereon, adapted to register with the slots 13 in member 11. Located between and within these friction members 11 and 12 are the usual concentric coiled springs 16 and 17, the same being preferably retained together independently of the friction members by means of the end plates 18 and 19 and screw bolt 20, the said plates being suitably recessed centrally to receive the head 21 and nut 22 of said screw bolt, the recess in plate 19 for the nut 22 being large enough to permit said nut to be adjusted. It will be observed that the friction members 11 and 12 and the followers 8 and 9 are centrally apertured to receive the nut 22 or head 21 of the bolt 20 therein under the buffing or pulling compression of the parts, as will be readily understood.

From the above description the operation of my improved construction will be understood to be as follows: When the parts are in their normally expanded position, (shown in Figs. 1 and 2,) due to the tension of springs 16 and 17, the followers 8 and 9 will abut against their respective shoulders 10 on the draft irons 5, and the outer ends of the lugs 15 of friction member 12 will just engage in the slots 16 of friction member 11, as seen in Fig. 2. Now when a buffing strain, for instance, is imparted to the draw bar 6 the yoke 7, follower 8, friction member 12, and plate 18 will be forced backward, thus compressing the springs 16 and 17 against the plate 19, said plate, as well as friction member 11, being retained against rearward movement by the abutment of follower 9 against its shoulders 10 on draft irons 5. At the same time, however, the rearward movement of friction member 12 will cause its lugs 15 to enter more deeply into the slots 13 of friction member 11, and the diagonal arrangement of said lugs and slots with respect to said friction members will necessarily cause the latter to rotate bodily on a central horizontal axis, thus causing said friction members to grind not only against the exterior followers 8 and 9, but also against the plates 18 and 19, thus exerting a material frictional resistance against the rearward movement of the draw bar. During a pulling strain exerted on the draw bar 6 it will be understood that the above described operation is reversed with respect to all the parts except the rotation of the friction members 11 and 12, the yoke or loop 7, follower 9, friction member 11, and plate 19 moving forward, while plate 18, friction member 12, and follower 8 remain stationary, due to the engagement of the latter against its shoulders 10, and said friction members being again rotated in the same direction, as hereinbefore described.

In Figs. 6 to 11 I have illustrated a somewhat different construction, the parts being the same as those shown in Figs. 1 to 5, except that there are three friction members 23, 24, and 25 instead of two, the member 23 being located at one end against the follower 8 and being provided with wings 26, having diagonal slots 27 therein, while the members 24 and 25 have each a wing 28 with a diagonal lug 29 thereon adapted to register with one of the slots 27 in the friction member 23, said members 24 and 25 having located therebetween the follower 9, all as shown in Figs. 6 and 7. The operation of this construction is the same as that of Figs. 1 to 5, except that by providing three friction members instead of two the frictional resistance is increased through the rotation of the friction members 24 and 25 each against the follower 9 as well as against the rear end of the strap or yoke 7 and the plate 19, it being understood that said members 24 and 25 are rotated in opposite directions.

In Figs. 13 to 16 I have illustrated a still different construction, there being four friction members 30, 31, 32, and 33, the same each consisting of a plate having projecting diagonally therefrom an arm 34. These friction members are arranged in pairs near each end of the yoke or strap 7, and their arms 34 contact with cam surfaces 35, preferably located on the inner side of the yoke or loop 7, the result being that when a buffing or pulling strain is exerted on the draw bar 6 said pairs of friction members are rotated in opposite directions, thus affording a frictional resistance against each other as well as against the followers 8 and 9 and the plates 18 and 19. If desired, however, said cam surfaces 35 may be located on the car body instead of on the yoke, for, as hereinafter stated, even said yoke is not an essential element to the use of my improvement and may be dispensed with, thus necessitating the location of said cam surfaces on other adjacent parts.

In Fig. 12 I have illustrated in detail side elevation the retaining plates 18 and 19 and central bolt 20 for the springs 16 and 17, said parts being shown separate to illustrate clearly how said springs may be handled separately and inserted in or removed from the draft rigging under tension, the nut 22 affording a means for accurately adjusting this tension.

In Figs. 17 to 20 I have illustrated an application of my novel principle of rotary friction resistance to a car truck as an auxiliary to the springs thereon. In said figure, 35 denotes the frame of the truck and 36 the truck bolster, the usual springs 37 and 38 being inclosed between the two friction members 39 and 40, the latter being cup-shaped and the member 39 being adapted to telescope within the member 40. Said member 39 is provided with exterior diagonally arranged lugs 41, adapted to engage with corresponding interior grooves 42 in member 40, whereby said members are forced to rotate when telescoped. In order to increase the friction surfaces somewhat, I preferably corrugate the same circularly, as shown, their engaging parts being similarly corrugated. Furthermore, in this construction, I have dispensed with the connecting plates 18 and 19 and provide a plate 43, carrying a vertical stem 44, substantially filling the space within the inner spring 38 to prevent any reduction in diameter of the springs 37 and 38 under compression and also to act as a guide for the same. I prefer to make the cup-shaped members 39 and 40 of such depth that when they telescope they will seat themselves within each other before the springs 37 and 38 reach the limit of their compression, thus forming a stop for said springs.

I wish it to be understood that in any of the hereinbefore described constructions one of the friction members may be fixed or immovable, which will result in a rotation of the other member twice the distance, thus accomplishing practically the same result. Furthermore, my improved construction may be applied with equal facility to the well-known tandem form of springs in draft rigging by simply duplicating the construction shown in Figs. 1, 6, or 13, as will be readily understood, or it may also be applied to the well-known draft bolt construction, in which no yoke 7 is employed, the draft bolt in such instance taking the place of the bolt 20 of Figs. 1 to 16.

Having thus described my invention, what I claim as new and desire to secure by Letters Patent, is: —

1. In a friction mechanism for absorbing strains, rotating friction plates or disks, held in contact throughout their rotation by spring pressure operating under compression strain and without torsional effect, the area of the contact between said friction plates or disks remaining constant during their mutual rotation within the limit of movement provided for the controlled spring.

2. In a draft rigging, an inclosing loop or yoke, a compression spring or springs therein, the ends thereof being free so as to be subjected to no torsional strain, followers at the ends of said spring or springs, and a friction member or members adapted to move with said followers during the compression strain on said spring or springs and to be rotated against friction surfaces during said movement, substantially as set forth.

3. In a draft rigging, an inclosing yoke or loop, a compression spring or springs therein, the ends thereof being free so as to be subjected to no torsional strain, followers at the ends of said spring or springs, and friction members engaging with each other and adapted to move with said followers and to be rotated against friction surfaces by their engagement with each other, substantially as set forth.

4. In a draft rigging, an inclosing yoke or loop, a compression spring or springs therein, the ends thereof being free so as to be subjected to no torsional strain, followers at the ends of said spring or springs, and friction members adapted to move with said followers and having diagonally arranged slots and lugs adapted to engage with each other whereby said friction members are rotated as they move toward or from each other, substantially as set forth.

5. In a draft rigging, followers, an inclosing yoke or loop, a compression spring or springs therein, retaining plates at the ends of said spring or springs, and a through-bolt centrally within said spring or springs and retaining said plates together, substantially as set forth.

6. In a draft rigging, an inclosing yoke or loop, a compression spring or springs therein, retaining plates at the ends of said spring or springs, a through-bolt centrally within said spring or springs and retaining said plates together, followers, and a plurality of friction members adapted to move with said followers, and means for rotating said members during said movement against the adjacent parts and each other, substantially as set forth.

In testimony whereof I have hereunto set my hand in the presence of two subscribing witnesses.

ROBERT E. L. JANNEY.

Witnesses:
PERCY B. HILLS,
EDWIN L. YEWELL.